Aug. 6, 1957 — R. I. BINDER — 2,801,723
FRICTION DISK CLUTCH CONNECTION
Filed Nov. 1, 1955 — 2 Sheets-Sheet 1

INVENTOR:
RICHARD IGNAZ BINDER
By
Richardson, David and Nordon
HIS ATTY'S.

United States Patent Office

2,801,723
Patented Aug. 6, 1957

2,801,723

FRICTION DISK CLUTCH CONNECTION

Richard Ignaz Binder, Schweinfurt (Main), Germany, assignor to Fichtel & Sachs A. G., Bavaria, Germany, a corporation of Germany Application November 1, 1955, Serial No. 544,313

Claims priority, application Germany November 5, 1954

6 Claims. (Cl. 192—99)

The present invention relates to a friction disk clutch, particularly for self propelled vehicles, having a plurality of levers supported by the cover or casing of the clutch and a thrust collar or pressure plate urged against the clutch plate, which collar may be lifted from the coupling plate in order to release the clutch.

In known clutches ball pins are used, for instance, as members connecting the levers and the thrust collar, the levers being held in the bores passing through the thrust collar. These bores interrupt the frictional surfaces of the thrust collar and thus exert an unfavorable effect on the clutch facing and also result in weakening of the thrust collar so that, particularly at the occurrence of thermal stresses, an increased risk of breaking exists.

However, it is also known to force these connecting bolts rigidly into small bosses cast on the thrust collar and to secure the bolts by pins, to thereby avoid interruption of the friction surfaces. The fixed position of the bolts in the lever joints, however, results in frictional loses which is responsible for complication of the operation of the clutch and which may therefore result in permanent breakages of the bolts.

It is therefore an object of the present invention to provide a simplified and improved connection between the clutch levers and the thrust collar.

A further object of the invention is to provide a connection between the clutch levers and the thrust collar of a friction disk clutch, which connection does not impair the frictional surface of the thrust collar and which does not introduce frictional losses elsewhere in operation of the clutch.

According to the invention as connecting members between the clutch levers and the presure plate there are provided swinging bolts laterally maintained in slots provided in projections on the thrust collar. These bolts are swingable about pins arranged in cross borings of the projections on the thrust collar. According to a further basic idea of the invention the pins are formed as resilient tension pins inserted with prestressing into the cross boring of the projection and thus do not require any additional protection against displacement.

In order to minimize the influence of the adjustment of the clutch levers on the swinging bolts due to centrifugal action, the angle through which the swinging bolts may pivot about their pins is limited. This limitation is obtained according to the invention by correspondingly limiting the distance between the base or bottom of each slot and the end of the swinging bolt received in the slot, the base of the slot and the end of the swinging bolt both being non-circular so that pivoting of the bolt wil be limited upon contact with the base of the slot.

The invention will now be described more fully with reference to the accompanying drawings showing a preferred embodiment in accordance with the present invention, wherein.

Figure 1:
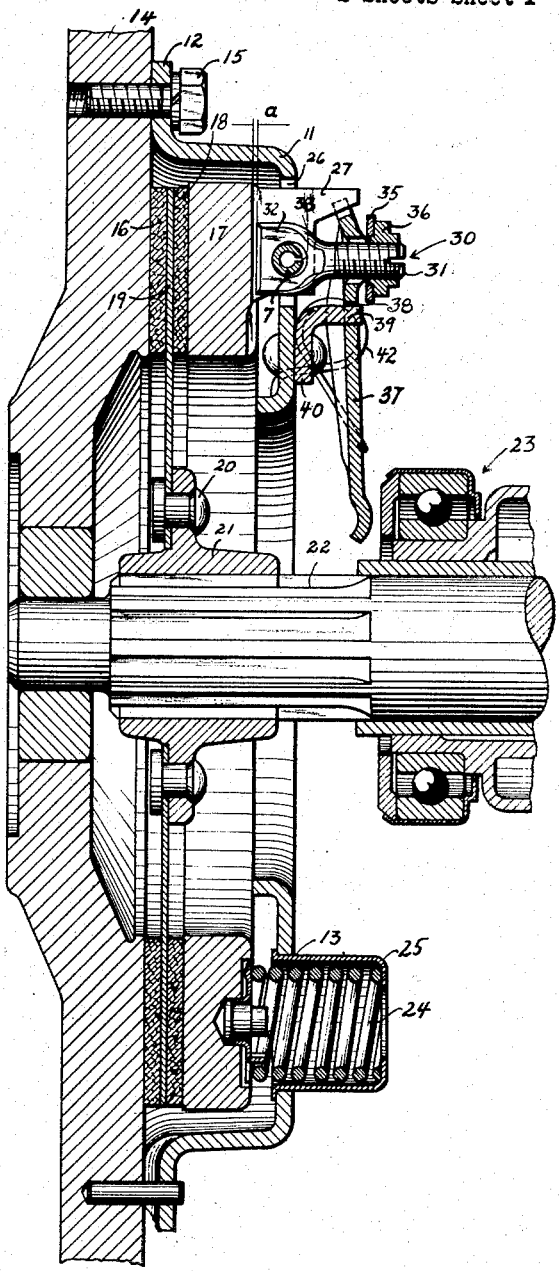
Figure 1 is a vertical section through a friction clutch having a single clutch plate, certain parts being shown in full.

Referring now more particularly to the drawings, in Fig. 1 there is shown an annular clutch casing 11 provided with a flange 12 and a plurality of uniformly distributed apertures 13. The casing 11 is secured along its flange 12 to the flywheel 14 of an automobile engine (not shown) by means of bolts 15, the flywheel 14 being provided with an annular friction facing 16.

Within casing 11 there is disposed an annular thrust collar or pressure plate 17 carrying a friction facing 18 arranged for cooperation with facing 16 on flywheel 14. A clutch plate or disk 19 is positioned between friction facings 16 and 18 and is held in proper alignment by means of bolts 20 securing it to a keyed bushing 21 on the driven shaft 22. The shaft 22 is provided with a clutch disengaging bearing 23.

Normally, the clutch is maintained in engagement by means of helical springs 24 housed in cup-shaped members 25 seated in apertures 13, the springs 24 urging thrust collar 17 toward flywheel 14 and thus clamping plate 19 between the friction facings 16 and 18. As a result, rotation of the flywheel 14 causes plate 19 to be rotated together with bushing 21 and shaft 22.

As shown in the drawings, at three locations spaced equally about the casing 11 holes 26 are provided. The collar 17 is provided with three supports or projections 27 projecting outwardly through the holes 26.

Figure 3:
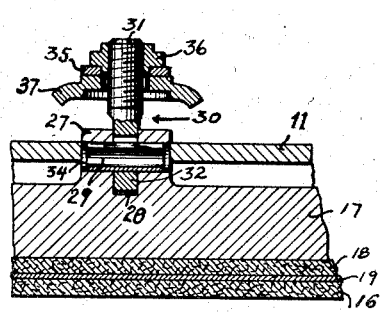
Figure 3 is a section taken along line III—III of Fig. 2.

The supports 27 are provided at their centers with radially extending slots 28 extending to a depth somewhat below the uppermost surface of collar 17 as viewed in Fig. 3. Each of the supports 27 is also provided with a transverse bore 29 extending therethrough perpendicularly to slot 28.

Figure 2:
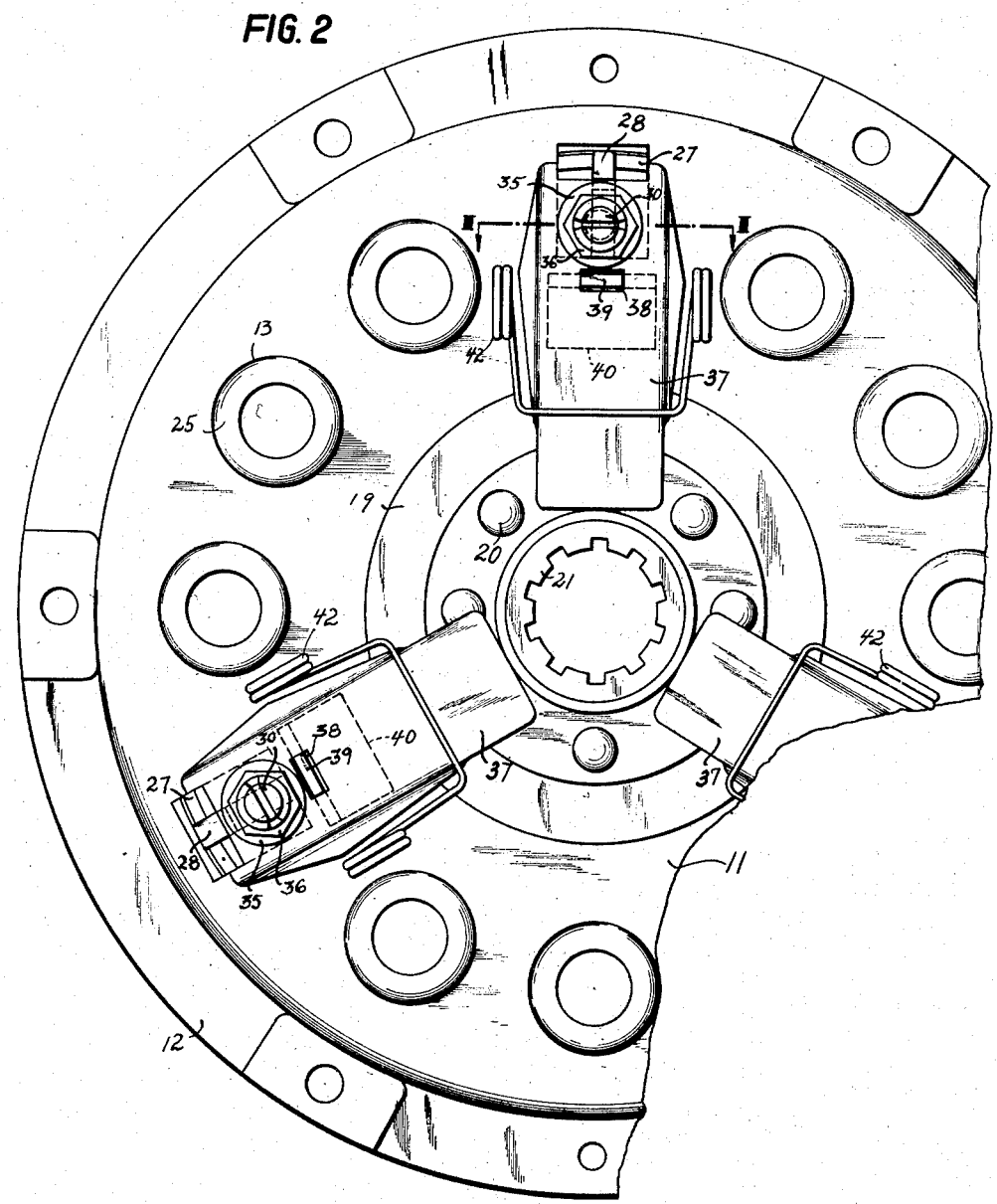
Figure 2 is a partial elevation of the clutch of Fig. 1.

A swinging bolt 30 having a cylindrical threaded end 31 and a flattened far end 32 extends into each slot 28, the flatened end 32 being provided with a hole 33 of slightly greater diameter than bore 29. A resilient tension pin 34 is prestressed into bore 29 while also passing through hole 33 of the swinging bolt 30. In this manner the swinging bolt is held to the collar 17 with the flattened end 32 spaced only a small distance "a" from the bottom of slot 28 when in normal position, as clearly shown in Figs. 2 and 3.

The threaded end 31 of the swinging bolt 30 carries a hardened disk 35 serving as a washer which is kept in place by adjusting nut 36. A clutch lever 37 also seats about threaded end 31 of the swinging bolt 30. In addition to the opening (not numbered) through which threaded end 31 passes, each of the levers 37 is also provided with a rectangular opening 38 through which a nose 39 of a fulcrum angle member 40 extends, which angle member is mounted on the casing 11 by rivets 41 or the like. A spring 42 urges the inner end of each lever 37 away from the casing 11 about threaded end 31 of swinging bolt 30 as an axis. By pressing the inner end of the lever 37 against the action of spring 42, the lever 37 is caused to pivot about fulcrum 40.

By advancing disengaging bearing 23 to the left in Fig. 1, the three levers 37 are pivoted about their respective fulcrums 40. The action of springs 42 is such that pivoting of the levers 37 causes washers or disks 35 to be carried to the right together with adjusting nuts 36. This of course carries the swinging bolts therewith together with thrust collar 17 which is connected to the swinging bolts by pins 34. As a result, collar 17 moves to the right against the urging of springs 24 and the facing 18 is moved away from clutch plate 19 so that only part or none of the rotation of flywheel 14 is transmitted to shaft 22 through the intermediary of keyed bushing 21.

Because of the small clearance "a" between the long flattened end 32 of the swinging bolt 30 and the bottom of slot 28, the swinging bolt is capable of swinging about axle 34 only to a small extent covering an angle of but a few degrees.

The novel structure permits the levers to be hinged to the thrust collar without impairing the surface of the thrust collar. Moreover, operation of the levers is effected almost completely without friction since a rolling movement takes place almost at all increments of power transmission. In addition, this arrangement overcomes the noteworthy and otherwise considerable influence of the displacement of the clutch levers under the action of centrifugal force because the displacement of the swinging bolt under centrifugal action is limited and this limited displacement has only a minimal affect on the disposition of the clutch lever.

Various changes and modifications may be made without departing from the spirit and scope of the present invention and it is intended that such obvious changes and modifications be embraced by the annexed claims.

What is claimed is:

1. In a friction disk clutch including a rotary driving member, a disk connected with a shaft to be driven, a thrust collar urged against said disk and causing the latter to rotate with said driving member, and lever means for displacing said thrust collar from said disk; at least one projection on said collar, said projection being provided with a radial slot and a transverse bore, a swinging bolt having a portion arranged in said slot and provided with a hole, a resilient tension pin arranged with prestressing in said bore of said projection, said pin being smaller in diameter than said hole in said swinging bolt and passing through said hole to thereby hold said swinging bolt in said slot, said lever means being provided with an opening through which said swinging bolt extends, and means on said bolt to prevent withdrawal thereof from said lever means.

2. A clutch as defined in claim 1, wherein said pin is smaller in diameter than said hole of said swinging bolt, said pin being a resilient tension pin arranged with prestressing in the bore of said projection.

3. A friction disk clutch comprising a rotating driving member; an annular casing carried by said driving member and provided with a plurality of apertures; an annular thrust collar within said casing and rotated therewith; a disk disposed between said casing and said driving member; spring means urging said collar against said disk and the latter against said driving member to thereby cause said disk to rotate with said driving member; a shaft operatively connected with said driven member for rotation therewith; a plurality of projections on said collar and extending respectively through said casing apertures, each of said projections being provided with a flat radially extending slot and a transverse bore, a flat ended swinging bolt provided with a hole of greater diameter than said bore and extending into said slot a small distance from the bottom of the latter, an axle passing through said bore and said hole to provide a pivot for limited movement of said swinging bolt within said slot, a lever pivoted about a fulcrum on said casing, and further spring means urging said lever in a direction maintaining said clutch in engaged position; and clutch disengaging means for pivoting said lever about said swinging bolt to thereby displace said bolt together with said projections and said collar, whereby said disk is disengaged from said collar and said disk and shaft no longer rotate with said driving member.

4. A clutch as defined in claim 3, wherein the end of each of said swinging bolts remote from said flattened end is threaded and provided with an adjusting nut, whereby the degree of pivotal movement of said lever in order to cause disengagement of said clutch may be varied.

5. A friction disk clutch comprising a rotary driving member, a disk to be driven, a thrust collar urged against said disk and causing the latter to rotate with said driving member, lever means for displacing said thrust collar from said disk and provided with an opening, and means for operatively connecting said lever means with said thrust collar and including at least one projection on said collar, said projection being provided with a radial slot having a non-circular base and with a transverse bore, a swinging bolt having a portion extending into said slot to a location normally spaced slightly from the base of said slot, said swinging bolt extending through said opening of said lever means and being provided with a hole, a pivot pin passing through said bore and said hole to thereby hold said swinging bolt in said slot, pivoting of said swinging bolt about said pin being limited due to eventual contact between the non-circular portion of said swinging bolt and the base of said slot, and means on said bolt to prevent withdrawal thereof from said lever means.

6. In a friction disk clutch including a rotary driving member, a disk connected with a shaft to be driven, a thrust collar urged against said disk and causing the latter to rotate with said driving member, and lever means for displacing said thrust collar from said disk; at least one projection on said collar, said projection being provided with a radial slot and a transverse bore, a swinging bolt having a portion arranged in said slot and provided with a hole, a pin passing through said bore and said hole to thereby hold said swinging bolt in said slot, said lever means being provided with an opening through which said swinging bolt extends, and means on said bolt to prevent withdrawal thereof from said lever means, the inner end of said slot in said projection being flat and radially directed, the end of the portion of the swinging bolt extending into said slot being similarly shaped and being disposed close to the inner end of said slot, said bolt thereby being capable of only limited pivotal movement about said pin within said slot.

References Cited in the file of this patent

UNITED STATES PATENTS 2,251,143    Loeffler    July 29, 1941

FOREIGN PATENTS 389,539    Great Britain    Mar. 23 1933